Figure 1:
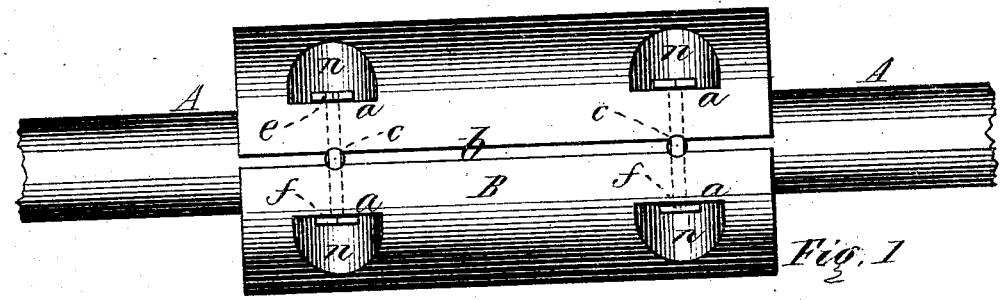
Figure 2:
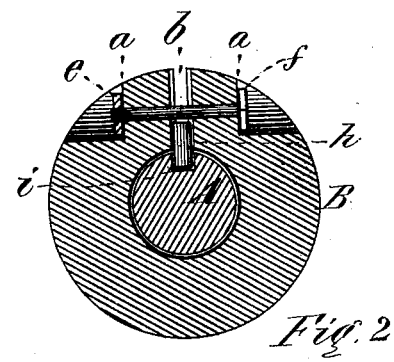

J. GIBBINS.
Shaft-Couplings.

No. 145,100.                                   Patented Dec. 2, 1873.

Witnesses,
C. E. Buckland
E. P. Kendrick

Inventor,
James Gibbins
By T. A. Curtis.
his Atty.

UNITED STATES PATENT OFFICE.

JAMES GIBBINS, OF SPRINGFIELD, MASSACHUSETTS.

IMPROVEMENT IN SHAFT-COUPLINGS.

Specification forming part of Letters Patent No. 145,100, dated December 2, 1873; application filed September 19, 1873.

*To all whom it may concern:*

Be it known that I, JAMES GIBBINS, of Springfield, in the State of Massachusetts, have invented an Improvement in Shaft-Coupling, of which the following is a specification:

The object of my invention is to secure the two adjoining ends of pieces of shafting together in a firm and cheap manner, so that if power be applied to rotate one piece of the shafting the other piece will be caused, by the coupling, to rotate also; and my invention consists of a cylindrical block of metal having a central hole made through its length, and one side thereof opened, from the hole to the periphery, its entire length.

The ends of the shafting being inserted into each end of the block, and brought together, or nearly so, pins are inserted, through the opening in the block, into holes made in the shafting, and the opened side of the block is bolted together, and is made to clasp the shafting tightly, the bolts which secure the opened side of the block being located directly outside the pins, and securing them in place.

In the drawings, A A represent the adjacent ends of two pieces of shafting, which are to be coupled together. A central hole, of the same size as the shafting, is made lengthwise through the block B, and one side of the block is cut open from the hole to the periphery at $b$ the entire length of the block. The ends of the two pieces of shafting are then inserted into the hole in the block, and are brought together, or nearly so, about midway, and a hole, $i$, is made in each piece of shafting at the point $c$, and a short pin, $h$, is inserted in each hole. The recesses $n$ are cast in the block, leaving a shoulder at $a$, and a hole being drilled through the block, across the opening $b$, from one shoulder to the other, a bolt, $f$, is inserted in each hole, and a nut, $e$, is turned upon the threaded ends of the bolts snugly and tightly against the shoulder.

As thus arranged, the block is made to grasp the two ends of the shafting very firmly, and, when both the shafting and the interior of the hole in the block are finished smoothly, the block has a firm hold upon the shafting; and the bolts $f$ are located directly over or outside the ends of the pins $h$, so that if the pins should be loose in the holes they cannot, by any possibility, be lost out.

It is obvious that the block B may be polygonal in its transverse section, or of any desirable and convenient form; and, instead of the recesses $n$, may have projecting ears cast thereon, through which to bolt the block together, without in the least departing from the principle of its construction and operation.

This device makes a very effective and cheap shaft-coupling, and may be adjusted to secure the two adjacent ends of shafting together in a very few minutes.

I am aware that various kinds of shaft-couplings have heretofore been made and used wherein pins were inserted into the shafting, and also wherein a spline and key were used, as shown in patent granted to Scott A. Smith, January 27, 1871, and I do not, therefore, claim the use of such pins, irrespective of my arrangement and construction of the whole device; but,

Having thus described my invention, what I claim as new is—

An improved shaft-coupling, consisting of the block B having an opening, $b$, therein its entire length, in combination with the bolts $f$, which serve to tighten the sleeve and lock the pins $h$, inserted in the shafting to which the coupling is attached, substantially as described.

JAMES GIBBINS.

Witnesses:
T. A. CURTIS,
C. E. BUCKLAND.